United States Patent
Chen et al.

(12)

(10) Patent No.: US 6,255,876 B1
(45) Date of Patent: Jul. 3, 2001

(54) SIMPLE GLITCHLESS PHASE SELECTION METHOD FOR MULTIPLEXING THE PHASE INTERPOLATED CLOCKS

(75) Inventors: Shin Chung Chen, Los Gatos; Fulvio Spagna, San Jose, both of CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/426,234

(22) Filed: Oct. 22, 1999

(51) Int. Cl.$^7$ ...................................... H03K 3/284
(52) U.S. Cl. ............................. 327/218; 327/170
(58) Field of Search ................................. 327/218, 219, 327/99, 36, 170

(56) References Cited

U.S. PATENT DOCUMENTS

| | | | |
|---|---|---|---|
| 5,004,933 | * 4/1991 | Widener | 327/218 |
| 5,481,568 | 1/1996 | Yada | 375/340 |
| 5,760,984 | 6/1998 | Spurbeck et al. | 360/51 |
| 5,771,127 | 6/1998 | Reed et al. | 360/51 |
| 5,793,236 | * 8/1998 | Kosco | 327/218 |
| 5,802,118 | 9/1998 | Bliss et al. | 375/350 |
| 5,812,336 | 9/1998 | Spurbeck et al. | 360/51 |
| 5,835,295 | 11/1998 | Behrens et al. | 360/51 |
| 5,852,524 | 12/1998 | Glover et al. | 360/51 |

* cited by examiner

*Primary Examiner*—Dinh T. Le
(74) *Attorney, Agent, or Firm*—W. Daniel Swayze, Jr.; W. James Brady; Frederick J. Telecky, Jr.

(57) ABSTRACT

A phase selector circuit for the interpolation of phase signals including a state machine for outputting data in accordance with a clock signal and a logic circuit for receiving said output data from said state machine, the logic circuit causing a clock-to-data delay for data falling longer than a clock-to-data delay for data rising.

3 Claims, 2 Drawing Sheets

SIMPLE GLITCHLESS PHASE SELECTION METHOD FOR MULTIPLEXING THE PHASE INTERPOLATED CLOCKS

FIELD OF THE INVENTION

The present invention relates to control of magnetic storage systems for digital computers, particularly to a sampled amplitude read channel that employs interpolated timing recovery.

BACKGROUND OF THE INVENTION

In magnetic storage systems for computers, digital data serves to modulate the current in a read/write head coil so that a sequence of corresponding magnetic flux transitions are written onto the surface of a magnetic medium in concentric, radially spaced tracks at a predetermined baud rate. When reading this recorded data, the read/write head again passes over the magnetic medium and transduces the magnetic transitions into pulses in an analog signal that alternates in polarity. These pulses are then decoded by read channel circuitry to reproduce the digital data.

Decoding the pulses into a digital sequence can be performed by a simple peak detector in a conventional analog read channel or, as in more recent designs, by a discrete time sequence detector in a sampled amplitude read channel. Discrete time sequence detectors are preferred over simple analog pulse detectors because they compensate for intersymbol interference (ISI) and are less susceptible to noise. As a result, discrete time sequence detectors increase the capacity and reliability of the storage system.

There are several well-known discrete time sequence detection methods including discrete time pulse detection (DPD), partial response (PR) with Viterbi detection, maximum likelihood sequence detection (MLSD), decision-feedback equalization (DFE), enhanced decision-feedback equalization (EDFE), and fixed-delay tree-search with decision-feedback (FDTS/DF).

In conventional peak detection schemes, analog circuitry, responsive to threshold crossing or derivative information, detects peaks in the continuous time analog signal generated by the read head. The analog read signal is "segmented" into bit cell periods and interpreted during these segments of time. The presence of a peak during the bit cell period is detected as a "1" bit, whereas the absence of a peak is detected as a "0" bit. The most common errors in detection occur when the bit cells are not correctly aligned with the analog pulse data. Timing recovery, then, adjusts the bit cell periods so that the peaks occur in the center of the bit cells on average in order to minimize detection errors. Since timing information is derived only when peaks are detected, the input data stream is normally run length limited (RLL) to limit the number of consecutive "0" bits.

As the pulses are packed closer together on the concentric data tracks in the effort to increase data density, detection errors can also occur due to intersymbol interference, a distortion in the read signal caused by closely spaced overlapping pulses. This interference can cause a peak to shift out of its bit cell, or its magnitude to decrease, resulting in a detection error. The ISI effect is reduced by decreasing the data density or by employing an encoding scheme to ensure that a minimum number of "0" bits occur between "1" bits. For example, a (d,k) run length limited (RLL) code constrains to d the minimum number of "0" bits between "1" bits, and to k the maximum number of consecutive "0" bits. A typical RLL (1,7) ⅔ rate code encodes 8 bit data words into 12 bit codewords to satisfy the (1,7) constraint.

Sampled amplitude detection, such as partial response (PR) with Viterbi detection, allows for increased data density by compensating for intersymbol interference and increasing channel noise immunity. Unlike conventional peak detection systems, sampled amplitude recording detects digital data by interpreting, at discrete time instances, the actual value of the pulse data. A sampling device samples the analog read signal at the baud rate (code bit rate) and an equalizing filter equalizes the sample values according to a desired partial response. A discrete time sequence detector, such as a Viterbi detector, interprets the equalized sample values in context to determine a most likely sequence for the data, i.e., maximum likelihood sequence detection (MLSD). In this manner, the effect of ISI and channel noise can be taken into consideration during the detection process, thereby decreasing the probability of a detection error. This increases the effective signal-to-noise ratio and, for a given (d,k) constraint, allows for significantly higher data density as compared to conventional analog peak detection read channels.

Similar to conventional peak detection systems, sampled amplitude detection requires timing recovery in order to correctly extract the digital sequence. Rather than process the continuous signal to align peaks to the center of bit cell periods as in peak detection systems, sampled amplitude systems synchronize the pulse samples to the baud rate. In prior art sampled amplitude read channels, timing recovery synchronizes a sampling clock by minimizing an error between the signal sample values and estimated sample values. A pulse detector or slicer determines the estimated sample values from the read signal samples. Even in the presence of ISI the sample values can be estimated and, together with the signal sample values, used to synchronize the sampling of the analog pulses in a decision-directed feedback system.

A phase-locked loop (PLL) normally implements the decision-directed feedback system to control timing recovery in sampled amplitude read channels. A phase detector generates a phase error based on the difference between the estimated samples and the read signal samples. A loop filter filters the phase error, and the filtered phase error operates to synchronize the channel samples to the baud rate.

The timing recovery circuits generally include phase selectors to select the appropriate phase to be interpolated. FIG. 1 illustrates one prior art design of a phase selector circuit. This phase selector circuit 100 takes advantage of the staggered nature of two parallel decode paths in producing the CLK_PHSEL_OUT signals. In this way, at least one transmission gate is turned on at any time, and no high impedance is seen by the interpolator drivers. As illustrated, flip-flop 102 and inverter 104 form a divide-by-two block. The clock 2 signal output from the flip-flop 102 is one-half of the clock signal input into flip-flop 102. When the clock 2 signal is low, and the clock signal is high, the NEXT_PHASE signal is latched into flip-flop 106.

During the next rising clock transition, a feedback latch circuit 106 will keep the output of latch circuit 106, for a duration of one additional clock cycle. Thus, the next phase signal is output from the latch circuit 106. Meanwhile, the subsequent NEXT_PHASE signal is latched into flip-flop 108. The cycle repeats, alternating between flip-flops. The output of flip-flop 106 is input into decode circuit 110, which decodes a 6-bit word, NEXT_PHASE (5:0) into "one hot" 64-bit word, and the output of flip-flop 108 is input to decode circuit 112. The output of decode circuit 110 and decode circuit 112 is input to OR circuit 114. The OR circuit 114 combines the two decoded signals PH_OUTA (phase out of decode A) and PH_OUTB (phase out of decode B) to produce the output of CLK_PHSEL_OUT signal. FIG. 1 illustrates the output signals. It can be readily seen that using these gating signals, the clock output from the transmission gate multiplexer effectively is the interpolated clock signals of the two simultaneously selected phase clock signals. The effective clock phase jump is only half of what was intended and, therefore, the gain is reduced by half.

It is desirable to achieve a glitchless phase selector, one which has no point in time when no phase is being selected.

SUMMARY OF THE INVENTION

The present invention utilizes a flip-flop or state machine as the basis for a phase selector for an interpolation driver. This flip-flop has a clock-to-Q delay when Q is falling, which is longer than the clock-to-Q delay when Q is rising. This delay difference may be achieved by a predetermined number of gate delays. Furthermore, if the delay difference in the flip-flop delays is guaranteed across all flip-flops used in the phase selector (i.e., any clock-to-Q delay when Q is falling is longer than any clock-to-Q delay when Q is rising) over process and environmental conditions, the transmission gate multiplexer will not see a high impedance at any time. Thus, the multiplexing of interpolated phase clocks is obtainable without losing gain and avoids interpolating between two simultaneous selected consecutive clock phases.

DETAILED DESCRIPTION OF THE PRESENT INVENTION

Figures 1, 1A:
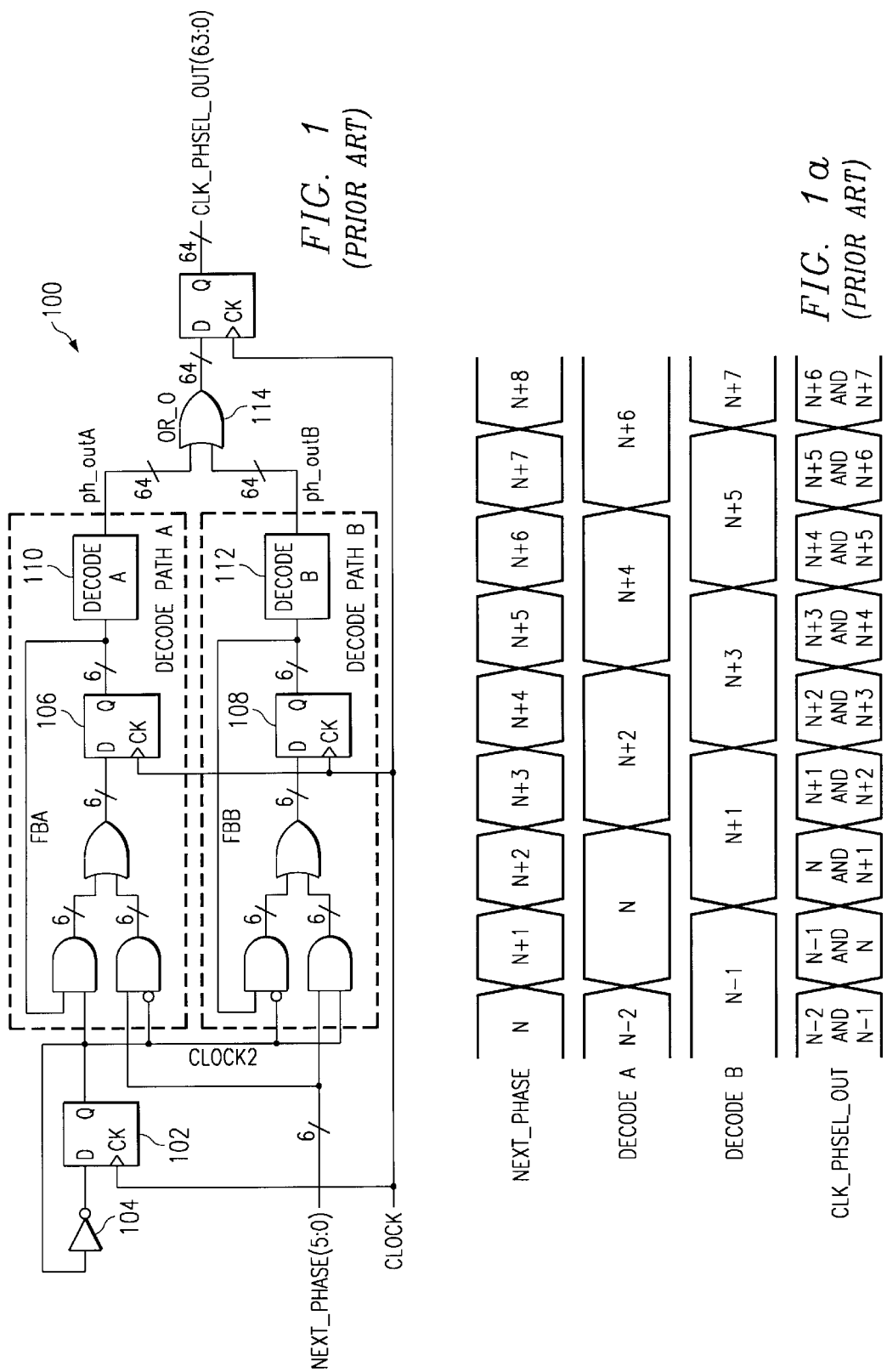
FIG. 1 illustrates a block diagram of a phase selector circuit.
FIG. 1a illustrates output signals from the circuit of FIG. 1.
Figure 2:
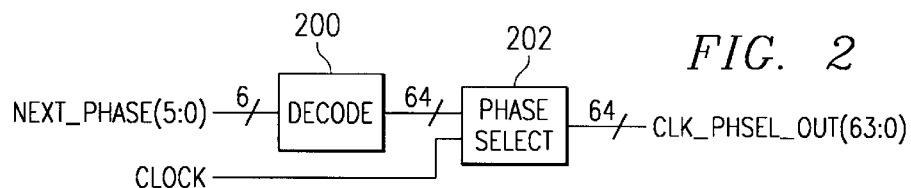
FIG. 2 illustrates another phase selector circuit of the present invention.

As illustrated in FIG. 2, the NEXT_PHASE signal is input to decode circuit 200. The decode circuit 200 decodes the six inputs which are a digital representation of 64 phases to select a phase clock. The decode circuit 200 is connected to phase selector circuit 202. The output of the decode circuit 200 is input to the data input of phase selector circuit 202. A clock signal is input to the clock input of phase selector circuit 202, and the CLK_PHSEL_OUT is output from the phase selector circuit 202.

Figure 2A:
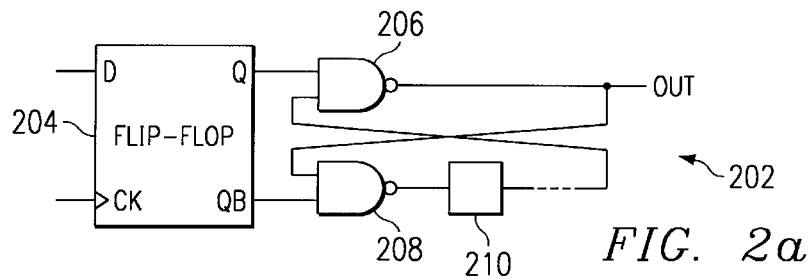
FIG. 2a illustrates the details of the asymmetric flip-flop of FIG. 2.

The phase selector circuit 202 is illustrated in more detail in FIG. 2a. The phase selector circuit 202 includes flip-flop 204, NAND circuit 206, NAND circuit 208, and a plurality of delay circuits 210. Delay circuits may be buffers, even number of inverters, or both. A flip-flop 204 or state machine is connected to NAND circuit 206 and to NAND circuit 208.

NAND circuit 206 and NAND circuit 208 form a logic circuit. The output of delay circuit 210 is connected to an input of NAND circuit 206, and an output of NAND circuit 206 is connected to an input of NAND circuit 208. An input of NAND circuit 208 is connected to the qb output of flip-flop 204. An input to NAND circuit 206 is connected to the output of NAND circuit 208. The output of NAND circuit 206 is the output signal for the phase selector circuit 202. FIG. 2a illustrates a single delay circuit 210; however, additional delay circuits could be added in series with the delay circuit 210 to provide for additional delay.

Figure 2B:
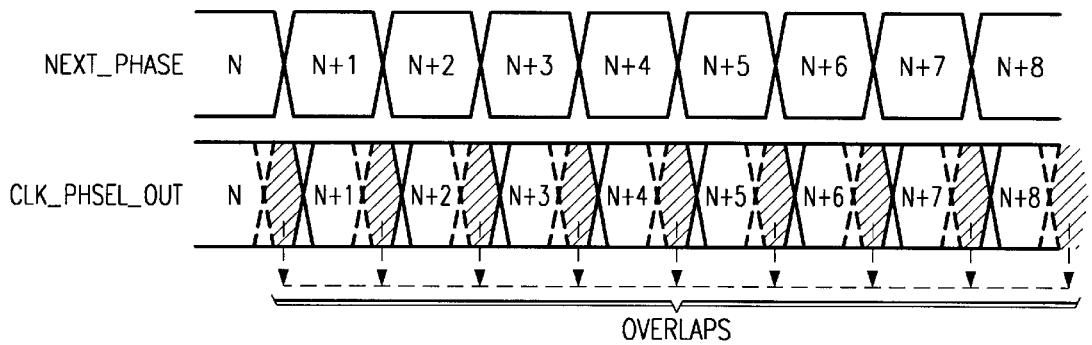
FIG. 2b illustrates input and output signals of the present invention.

As shown in FIG. 2b, the NEXT_PHASE signals are illustrated as well as the CLK_PHSEL_OUT signal. The shaded areas in CLK_PHASE_OUT in FIG. 2b correspond to transitions from one clock phase to the next.

Figure 3:
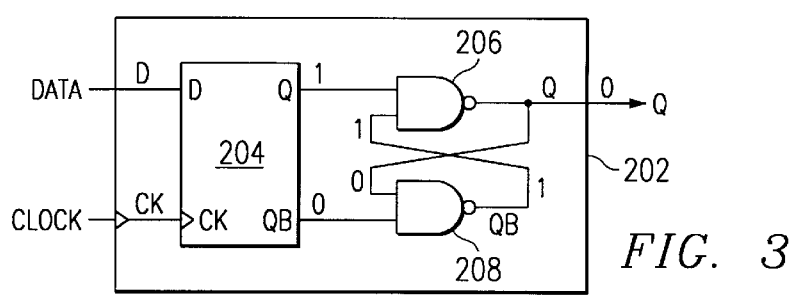
FIG. 3 illustrates the phase selector circuit with clock-to-Q rising.
Figure 4:
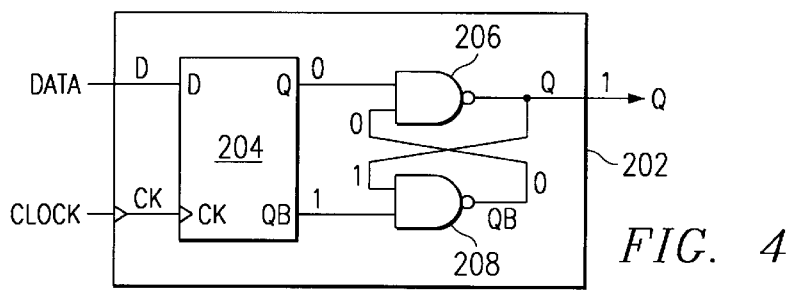
FIG. 4 illustrates the phase selector circuit with clock-to-Q falling.

In FIGS. 3 and 4, there could be sufficient delay in NAND circuit 208 so that the clock-to-Q delay for Q falling is longer than the clock-to-Q delay for Q rising.

As illustrated in FIG. 3, the logic states for all the nodes after D="1" is clocked into the flip-flop 204 are shown. Note that Q="0." When D="0" is clocked into the flip-flop 204, q changes from "1" to "0," and qb changes from "0" to "1." Independent of the state of QB, Q will rise to "1" after one gate (NAND circuit 206) delay. Therefore, the clock-to-Q delay for Q rising equals the flip-flop 204 delay plus the gate delay of NAND circuit 206.

Q falling is the falling edge of data signal as the data signal is outputted from the phase selector 202. The Q signal is measured against the clock signal input to the flip-flop 204.

FIG. 4 shows the logical states of all nodes after D="0" is clocked into the flip-flop 204. Note that Q="1." When D="1" is clocked into the flip-flop, qb changes from "0" to "1" and q changes from "1" to "0." Independent of the state of Q, QB will rise to "1" after one gate (NAND circuit 208) delay. At this time, since both inputs to NAND circuit 206 are "1," Q starts to fall after the delay through NAND circuit 206. Therefore, the clock-to-Q delay for Q falling equals the flip-flop 204 delay plus the gate delays of NANDs 206 and 208. Thus, it can be clearly seen that the clock-to-Q delay for Q falling is longer than the clock-to-Q delay for Q rising.

As a result of clock-to-Q delay for Q falling longer than clock-to-Q delay for Q rising, the phase selector provides glitchless phase selection, high impedance is not seen at any time, and gain is not lost.

What is claimed is:

1. A phase selector circuit for interpolation of a phase signal, comprising:

a state machine receiving said phase signal for outputting an output data having a data edge rising and a data edge falling in accordance with a clock signal; and a logic circuit for receiving said output data from said state machine, said logic circuit generating said interpolated phase signal having a clock signal-to-data signal delay for the data edge falling longer than a clock signal-to-data signal delay for said data edge rising.

2. A phase selector circuit as in claim 1, wherein said state machine is a flip-flop.

3. A phase selector circuit as in claim 1, wherein said logic circuit is at least one NAND circuit.

* * * * *